Nov. 11, 1952  G. A. TATGE  2,617,505
MOTORCYCLE GEAR SHIFT
Filed Jan. 15, 1951  2 SHEETS—SHEET 1
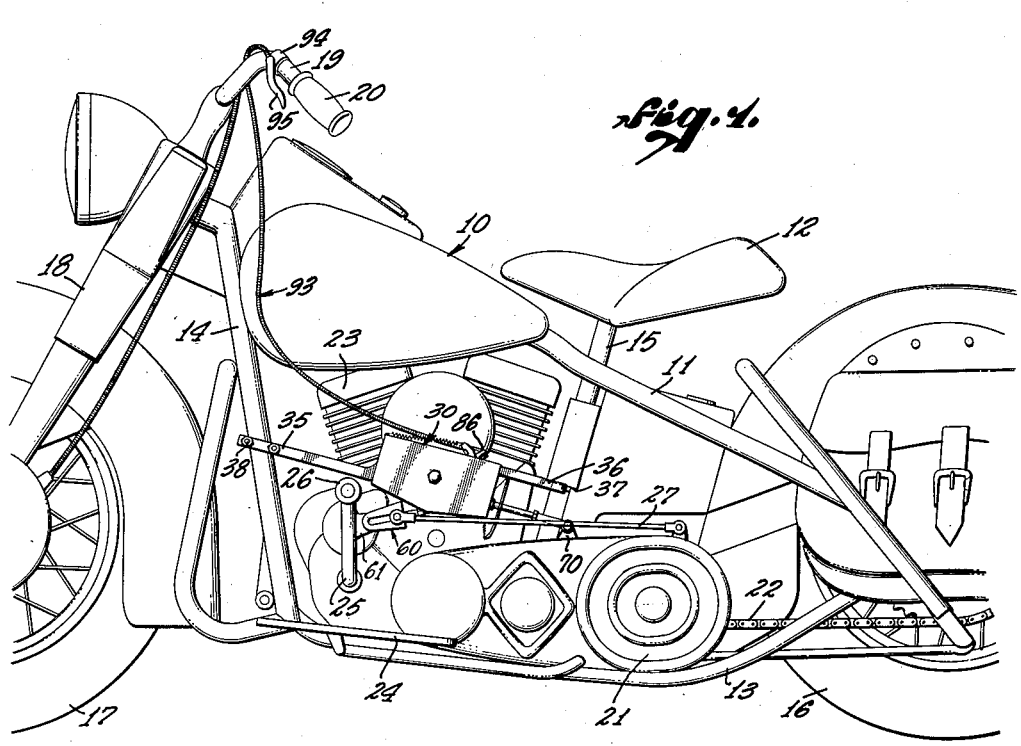
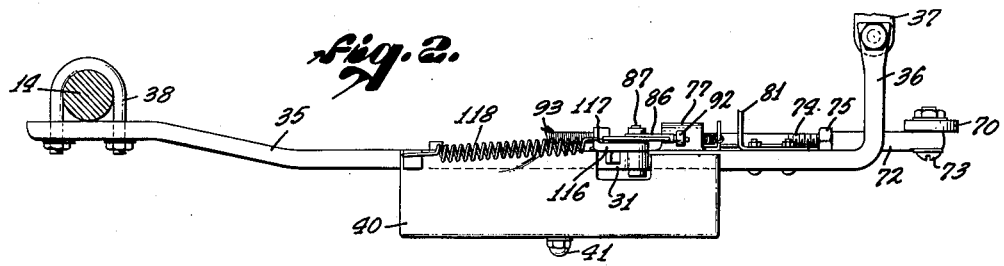
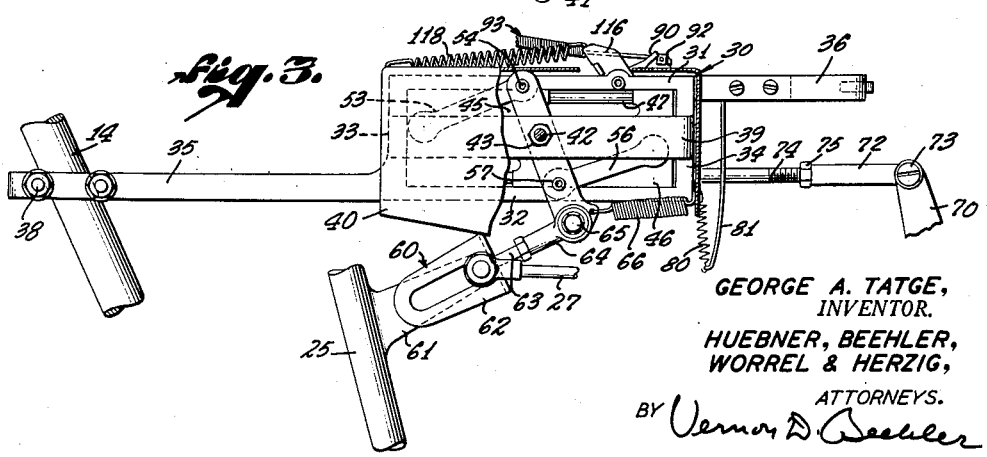
GEORGE A. TATGE,
INVENTOR.
HUEBNER, BEEHLER,
WORREL & HERZIG,
ATTORNEYS.

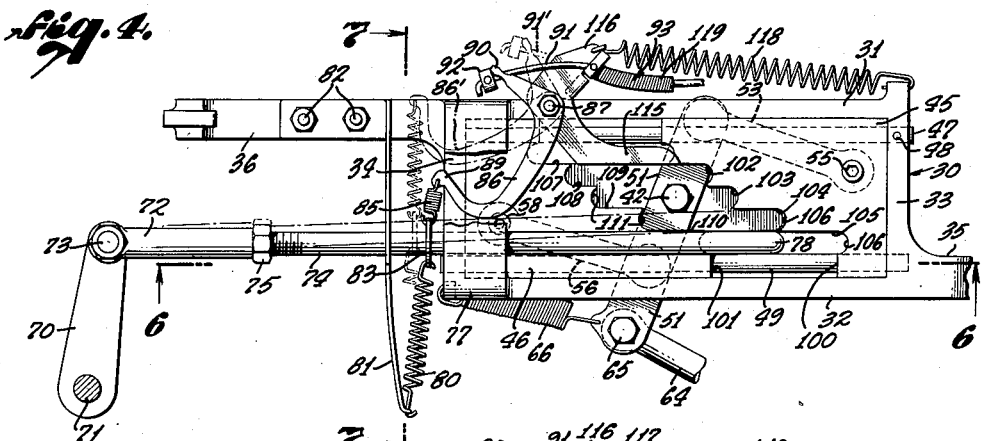
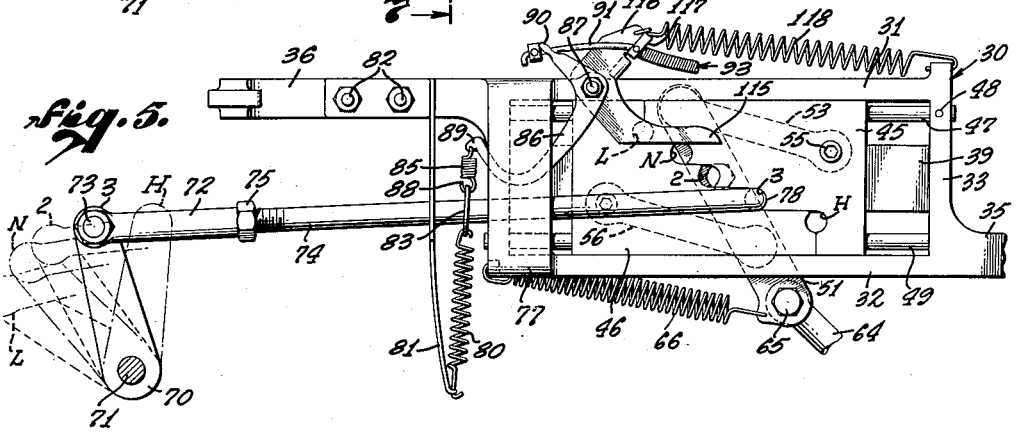
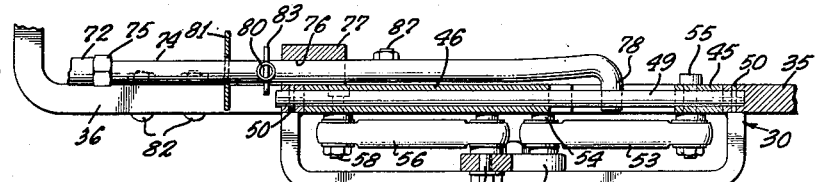
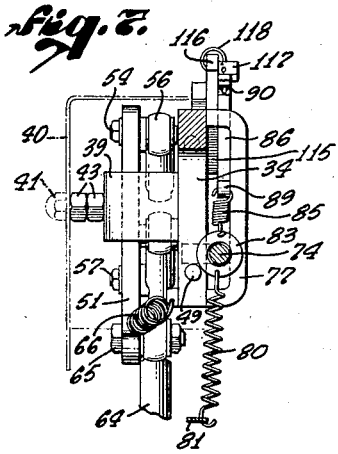
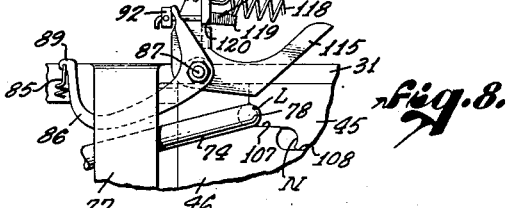

Patented Nov. 11, 1952

2,617,505

UNITED STATES PATENT OFFICE 2,617,505

MOTORCYCLE GEAR SHIFT

George A. Tatge, Monterey Park, Calif.

Application January 15, 1951, Serial No. 206,012

5 Claims. (Cl. 192—3.5)

The invention relates to a gear shifting device particularly well adapted to shifting gears on a motorcycle wherein the gears are shifted from one stage to another by manipulation of a foot pedal.

The transmission on a motorcycle is characterized by three or four gear shift positions on one side of a neutral position wherein the gear ratio is progressively higher as the shift is made away from neutral and also the presence of a low gear lower than the other gears lying on the other side of neutral position. Ordinarily a hand lever is relied upon to shift gears, the lever being customarily located in an upwardly extending position at the side of the mid-portion of the frame in front of the rider. The clutch is thrown out and in by manipulation of a foot pedal. In operating a gear shift of the conventional sort it is necessary in shifting up in gear ratio for the operator or rider to remove one hand from the handle bar to thus manipulate the gear shift lever. In other words, the rider must steer with one hand while shifting from neutral to low, to second and then to the higher gears. As the vehicle is accelerating under those circumstances the rider or operator does not have maximum control over the vehicle.

For stopping operation of the vehicle the operator may release the clutch in the customary fashion by pressing on the clutch pedal and on the brake. There is not, however, a ready means provided for progressively shifting from a high gear ratio position to lower gear ratio positions.

It is therefore among the objects of the invention to provide a new and improved semi-automatic gear shift for such vehicles as motorcycles wherein the gear shifting operation is entirely operated by a foot pedal during acceleration of the vehicle.

Another object of the invention is to provide a new and improved gear shift for vehicles such as motorcycles wherein by manipulation of a foot pedal the gears may be shifted progressively from neutral to the other higher gear ratio positions without it being necessary for the operator to remove his hands from the handlebar.

Still another object of the invention is to provide a new and improved semi-automatic gear shift for vehicles of the nature of motorcycles wherein by manipulation of a finger-operated trigger to an actuated position the gears may be shifted progressively downward in gear ratio from highest to lowest by manipulation of the foot pedal only, there being also included as an object of the invention the provision of a special actuator which can be manipulated by the finger without removing the hands from the handlebars adapted to permit a shift into lowest gear by operation only of a foot pedal, the foot pedal being connected to the transmission and the clutch so as to operate both in proper sequence.

Also included among the objects of the invention is to provide a new and improved semi-automatic gear shift or motorcycle transmission operable without it being necessary to remove the hands from the handlebars which is so constructed that it can be added to and used with conventional transmissions on motorcycles already in service.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of a motorcycle showing the relative location of the gear shift of the invention.

Figure 2 is a plan view of the gear shift.

Figure 3 is a side elevational view of the gear shift with a portion of the casing broken away to reveal the working parts.

Figure 4 is a side elevational view of the gear shift on the reverse side from that shown in Figure 3 showing jaws in open position.

Figure 5 is a side elevational view similar to Figure 4 showing the jaws in closed position.

Figure 6 is a bottom sectional view of the gear shift taken on the line 6—6 of Figure 4.

Figure 7 is a cross-sectional view taken on the line 7—7 of Figure 4.

Figure 8 is a fragmentary elevational view showing a neutral position limit bar adjusted to permit shift into the lowest gear.

A conventional motorcycle 10 is illustrated in Figure 1 having a frame which includes a crossbar 11, a seat 12, a chassis bar 13 and a forward diagonal brace 14. A seat post 15 supports the seat. At the rear is a wheel 16 and at the front is a wheel 17, the wheel 17 being supported by a forked structure 18 at the top of which are the handlebars 19 provided with the usual grips 20. A conventional transmission 21 is shown located approximately beneath the seat 12 and in advance of the rear wheel to which it is connected by means of a chain 22. The transmission is operated by a conventional combustion engine 23 located in the mid-portion of the motorcycle.

Conventional structure is followed to the extent of providing a pedal platform 24 upon which is mounted a clutch lever 25 terminating in a clutch pedal 26, the clutch lever being connected by means of a clutch rod 27 to a clutch, not shown, but which is associated in the usual manner with the transmission 21. In the structure shown the clutch pedal is manipulated forward and back to respectively disengage and re-engage the clutch instead of providing a rocking pedal as may sometimes be used.

The gear shift comprising the subject matter of the invention is here illustrated as comprising a somewhat rectangular housing indicated generally by the reference character 30 having upper and lower walls 31 and 32 and end walls 33 and 34. For securing the housing to the motorcycle frame there is provided a forwardly extending bracket arm 35 shown in Figure 1 attached to the diagonal brace 14 and a rearwardly extending bracket arm 36 attached to a portion 37 of the frame at a location adjacent the seat post 15. By employment of a clevis 38 the forwardly extending bracket 35 may be adjusted up or down on the diagonal brace in order to properly position the housing. A similar adjustment may be provided if necessary for the rearwardly extending bracket.

A U-shaped support 39, seen to good advantage in Figures 3 and 6, extends along the side of the frame 30 and provides a means for mounting linkage for manipulating the jaws subsequently to be described. A cover plate 40 is held in place on the support 39 and over the housing by a nut 41 on an appropriate bolt 42. The cover may be adjusted by means of locating nuts 43 as illustrated in Figure 7.

Within the clutch housing are a pair of oppositely reciprocating jaws 45 and 46. These jaws are more clearly seen in side elevation in Figures 4 and 5. The jaws are so mounted that they reciprocate in a horizontal direction as viewed in Figures 4 and 5, the jaws being slidably mounted and retained within the upper and lower walls 31 and 32 of the housing 30. A rod 47 is shown for holding the jaws in proper position, the rod being adapted to extend horizontally through the jaws as best illustrated in Figure 6. The rod is anchored at the ends in the end walls 33 and 34 by means of a cotter pin 48. A similar rod 49 holds the bottoms of the jaws in position, the rod 49 being secured by means of cotter pins 50. In this fashion the jaws are retained in their reciprocating positions within the housing.

In order that the jaws 45 and 46 may move toward and away from each other the same distance and at the same rate, there is provided a linkage device embodied in a lever 51 secured by means of the bolt 42 to the support 39 and hence to the housing 30.

At the upper end of the lever 51 is a link 53 pivotally secured by a pin 54 to the lever. At its other end the link 53 is pivotally secured by a pin 55 to the reciprocating jaw 45. A second link 56 is pivotally secured to the lever 51 by means of a pin 57, the location of the pin 57 being the same distance from the bolt 52 as a center as is the pin 54. The link 56 is in turn secured to the jaw 46 by means of a pin 58. The links 53 and 56 are made the same length and being pivotally secured to the lever 51 at the same distance from its pivot point, reciprocation of the lever will shift the jaws toward each other when rotated in one direction and away from each other when rotated in the opposite direction at the same rate.

In order that the jaws may be reciprocated at will by the operator through the agency of the foot pedal 26 there is provided an adjustable shift rod 60 comprising an arm 61 connected to the pedal, this arm being linked to a shackle 62 which in turn is connected to a short rod 63. The short rod is joined by means of a bushing 64 to the lower end of the lever 51 by means of a bolt 65. A spring 66 anchored to the housing 30 at one end and to the lever 51 at the other end tends normally to draw the pedal 26 rearwardly toward the operator of the vehicle. In this position the jaws 45 and 46 are held open as illustrated in Figure 4.

For changing the gear ratio in the transmission there is provided a transmission arm 70 rotating on a shaft 71 which is in turn connected to the transmission, the precise locating being one of a conventional character not illustrated in the drawings. The arm has a bushing 72 pivotally secured thereto by a pin 73 and a transmission rod 74 is adjustably secured to the bushing 72 where it can be tightened in place by a locking nut 75. The transmission rod extends slidably through a long aperture 76 confined by a portion 77 of the housing 30 and has a transversely extending element 78 at the end remote from the bushing 72. The transverse element has a position between the jaws 45 and 46 as illustrated best in Figures 4, 5 and 6.

From an examination of the structure and particularly as illustrated in Figures 4 and 5, it will be apparent that the transmission rod 74 is adapted to swing up and down about the pin 73 as a pivot point. Normally the transmission rod is spring-biased in a downwardly swinging direction by tension in a coil spring 80. One end of the coil spring, namely, the lower end, is attached to the lower end of a spring bracket 81 which is bolted to the rearwardly extending bracket 36 of the housing by means of bolts 82. The other end of the spring is attached to the transmission rod by means of a yoke 83.

The spring 80 has sufficient force so that normally the transmission rod 74 tends to be swung about the pin 73 in a downward direction, as viewed particularly in Figures 4 and 5. When swung downwardly manipulation of the gear shift tends to hold the transmission adjustment to a higher gear ratio.

To reverse the adjustment and move the transmission adjustment toward a lower gear ratio and eventually to a neutral position, the transmission rod 74 is spring-biased in an upward direction. This is accomplished by interjecting the force of a second coil spring 85 which when placed under tension has a greater force than that of the spring 80.

The adjustment just described is accomplished through a somewhat U-shaped lever or crank 86 which is pivotally mounted by means of a bolt 87 to the top wall 31 of the housing 30. The spring 85 is anchored at its lower end 88 to the yoke 83 and at its upper end to an extension 89 of the U-shaped crank. At its opposite end 90 the U-shaped crank has attached thereto the interior wire 91 of a Bowden cable wherein a collar 92 draws against the end 90 when the wire is pulled upon. The Bowden cable indicated generally by the reference character 93 extends upwardly to a collar 94 by means of which it is attached to one of the handlebars 19. There is also provided a trigger 95 attached to the Bowden cable and so positioned that it can be operated by the rider on the vehicle with the index finger of one hand.

By manipulation of the trigger 95 throughout a portion of its full throw the wire 91 is pulled imparting to the U-shaped crank 86 a clockwise motion as viewed in Figures 4 and 5 and also Figure 8. Rotation of the U-shaped crank in the direction described places additional tension on the spring 85 sufficient to overcome the tension of the spring 80 and thereby to bias the transmission rod 74 in an upward direction.

In order to manipulate the transmission rod 74 by use of the transverse element 78 the jaws 45 and 46 are provided respectively with opposite faces 100 and 101. In the face 100 there are provided a series of steps 102, 103, 104 and 105. At the end of each step is a semi-cylindrical recess portion 106 corresponding in shape to the shape of the transverse element 78 and adapted to receive it. On the face 101 are a somewhat corresponding series of steps 107, 108, 109 and 110 at the ends of which are semi-cylindrical recesses 111, also for reception of the transverse element 78. It may be noted that the steps are of different length in order to accommodate a different degree of rotation of the transmission arm 70 and also to permit a shift from second gear directly to low gear. For convenience in explanation and by reference to Figure 5, low gear position is indicated by the reference character L, neutral by N, second gear by 2, third gear by 3 and high gear by H.

By way of explanation let it be assumed that the gear shift has been operated through its various positions until the transmission rod 74 is in high gear position which is the solid line position shown in Figure 4. Assuming then that it is desirable to shift down in gear ratio, the trigger 95 is partially depressed sufficient so that the wire 91 of the Bowden cable is drawn upon until it assumes the dot and dash position 91' in Figure 4. This will tilt the U-shaped crank 86 until it assumes the dot and dash position 86'. In that position the spring 85 will be under tension as also illustrated in the dot and dash position. The effect of this will be to spring-bias the transmission rod 74 upwardly. This will immediately lift the transverse element 78 from the position shown in solid line in Figure 4 immediately adjacent the step 105 to a position adjacent the step 104 which will stop it temporarily although the spring bias tendency continues. The shift rod lever may then be manipulated to shift the transmission to the next lower gear ratio by operation of the pedal 26. When the pedal is shifted forwardly as viewed in Figure 1 and also Figure 2, the pedal motion acts through the shift rod 63 to reciprocate the jaws 45 and 46 throwing them together. The recess 106 and the end of the step 104 will then strike the transverse element 78 and move it a short distance from right to left as viewed in Figures 4 and 5 until the transmission rod has been moved to the third gear ratio position, namely, position number 3.

After gear ratio position number 3 has been set the pedal is released and the jaws reciprocate away from the transverse element 78. They will move far enough so that the step 104 clears the transverse element which is then spring-biased upwardly into contact with step number 103. The new shift position will not, however, be accomplished until the pedal 26 is again pressed and the jaws 45 and 46 again reciprocated. This next reciprocation will bring the recess at the end of the step 103 into contact with the transverse element and move it from right to left to gear shift position number 2 which is the next lower gear ratio position.

As the jaws are released by release of the foot pedal and the jaws returned to a position open with respect to each other, the transmission rod 74 maintains its position set for gear position number 2 until the foot pedal is again reciprocated, this time moving the recess at the end of step 102 into contact with the transverse element 78 and thereby pushing it to a neutral position N.

The shift down is from second gear position into neutral rather than from second gear position into low gear position. Movement of the transverse element 78 will be halted in neutral position by the interposition of a neutral limit bar 115. If it were not for the interposition of the neutral limit bar 115 the transverse element 78 would shift directly from second gear to low gear.

Normally the neutral limit bar 115 is retained in the position shown in Figures 4 and 5. The neutral limit bar is pivotally secured to the wall 31 of the housing 30 by the same bolt 87 by means of which the U-shaped crank 86 is pivoted thereto. The neutral limit bar has an upwardly extending portion 116 and a lug 117 extending laterally therefrom to provide a stop by bearing against the outside surface of the wall 31 in order to position the neutral limit bar properly. A coil spring 118 normally tends to urge the neutral limit bar pivotally in a clockwise direction as viewed in Figures 4, 5 and also 8.

When it is decided to remove the neutral limit bar from the position shown in Figures 4 and 5 to a position corresponding to that shown in Figure 8, the Bowden cable is manipulated by pressing harder upon the trigger 95. When the trigger 95 is pressed harder, a wound outer jacket 119 of the cable is urged from right to left as viewed in Figures 4, 5 and 8. The jacket end 120 presses against the end 116 of the neutral limit bar urging it against tension of the spring 118 in a counter-clockwise direction until it reaches a position shown in Figure 8. Greater tension in the spring 118 than in the spring 85 prevents movement of the neutral limit bar when the trigger 95 is initially depressed. It will be appreciated that before the neutral limit bar is located in that position, tension will also be set up in the spring 85 by initial pressure on the trigger 95 so that there continues to be a spring bias urging the transmission rod 74 upwardly.

When the neutral limit bar has been moved away from its barring position, the transmission rod 74 will be urged against the pin 47 which will stop it so that the transverse element 78 lies in the low gear position between the faces of the jaws. To positively shift from neutral to low gear, the pedal 26 is kicked in the customary fashion moving the jaws 45 and 46 once again toward each other. During this movement the recess in the jaw 45 opposite the recess adjacent the step 107 in the jaw 46 will shift the transverse element 78 and the transmission rod 74 from right to left a distance sufficient to change the transmission setting to a low gear ratio. That is the position of the transmission rod illustrated in Figure 8.

To then proceed from low gear toward the higher gear ratio setting it is necessary only for the operator of the vehicle to release all pressure and the trigger 95 and then kick the pedal 26 in the customary manner. When the trigger 95 is released the spring 118 will tend to return the neutral limit bar to its normal position as shown in Figures 4 and 5. This will also release tension on the spring 85 and thereupon the spring 80 will become operative to bias the transmission rod 74 downwardly as viewed in Figures 4, 5 and 8.

Immediately prior to depressing the pedal 26 the jaws 45 and 46 will have been opened from the position shown in Figure 8. Opening of the jaws will remove the step 107 from its position beneath the transverse element 78 and this element and consequently the transmission rod 74 will fall into position against the step 109 without yet however changing the gear setting from low gear.

The reason the transverse element will skip the step 108 is because the steps 107 and 108 are short enough so that the throw of the jaw 46 from right to left will be sufficient to clear both of these steps and permit the transverse element to skip neutral gear and fall into second gear which is determined by the step 109. When the transverse element has reached a position against the step 109 as the pedal 26 is kicked, the jaws 46 and 45 will be rubbed together, the jaw 46 moving the appropriate recess at the step 109, namely, the recess 111, against the transverse element moving it this time from left to right a distance sufficient to shift the transmission setting from low to second gear.

In order thereafter to shift from second to third gear it is necessary only to again kick the pedal 26 and inasmuch as the transmission rod continues to bias downwardly, it will fall against the step 110 in which position it will be moved by motion of the jaws to the third gear setting. To change to high gear the pedal 26 is again kicked and the next shift occurs in the same fashion.

From the foregoing description it will become apparent that when the vehicle is at rest the operator can give his attention to the gear shift and depress the trigger 95, thereby making it possible to shift to low gear before the vehicle begins to accelerate. Thereafter the operator can release the trigger 95 and have both hands fully gripping the handlebars so that steering the vehicle is under full control and the shift upwardly from low to second, third and high gear can be accomplished by no movement other than depressing the pedal 26.

The shift from high gear down is comparable although this manipulation is not so critical in that by depressing the pedal 26 the clutch is released and power is no longer applied to the rear wheel. The shift down is made step by step thereby minimizing possibility of damage to the gears which might otherwise occur from a shift from high gear to low gear without other gears intervening.

By operation of the gear shift device herein described all shifting from one gear to another either from lower gears to higher gears or from higher gears to lower gears and neutral, is accomplished by operation of the foot pedal. It is not necessary in shifting in either direction for the operator of a vehicle such as a motorcycle to remove his hands from the handlebars as is the case in conventional gear shifts. Where maximum control is desirable, that is, shifting from low to higher gears, no finger manipulation is necessary at all but only depression of the foot pedal. This accomplishes a step by step shift as slowly or as rapidly as may be desired by use of the foot. The clutch is disengaged automatically at the same time in proper sequence by the same foot pedal, making it unnecessary for the operator to synchronize hand and foot movements. The same general manipulation occurs when shifting downwardly in gear except that the trigger 95 must be manipulated by the index finger of the operator's left hand while still on the handle bars. A very convenient and improved gear shift mechanism is thus provided adaptable to substantially any standard transmission on vehicles of this kind and one capable of promoting a great increase in safety and control of the vehicle.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a gear shift having a transmission with a neutral position and progressively increased speed-ratio positions, a clutch associated with the transmission and a shift pedal connected to the clutch, the combination of a housing adapted to be fixed in position relative to the transmission, a pair of jaws slidably mounted in the housing for relative reciprocating movement, jaw faces having a series of complementary steps respectively for a series of neutral and increased speed-ratio positions, a rod connected between the transmission and the gear shift adapted to be moved by the jaws in the same direction as the jaw movement for shifting gears and normally spring biased laterally from initial position at one end of the series to a position at the other end of the series, said rod including a transverse element interposed between the jaw faces, said rod being adapted to be shifted laterally in a direction toward said other end of the series one step at a time with each movement of the pedal in one direction thereof, and means adapted to return said rod laterally to initial position.

2. In a gear shift having a transmission with a neutral position and progressively increased speed-ratio positions, a clutch associated with the transmission and a shift pedal connected to the clutch, the combination of a housing adapted to be fixed in position relative to the transmission, a pair of jaws slidably mounted in the housing for relative reciprocating movement, opposite jaw faces having a series of complementary steps respectively for a series of neutral and increased speed-ratio positions, a rod connected between the transmission and the gear shift adapted to be moved by the jaws in the same direction as the jaw movement for shifting gears and normally spring biased laterally toward the higher speed-ratio positions, said rod including a transverse element interposed between the jaw faces, said rod being adapted to be shifted laterally in a direction toward the higher speed-ratios one step at a time with each movement of the pedal, and a manually actuated element including a spring member connected between a handlebar and the rod adapted when set in actuated position to spring bias the rod laterally in a direction toward the lower speed-ratios with each clutch disengaging movement of the pedal.

3. In a gear shift for a motorcycle having a transmission with a neutral position and progressively increased speed-ratio positions, a clutch associated with the transmission and a shift pedal connected to the clutch having movement in one direction for disengaging and movement in another direction for engaging the clutch, the combination of a housing adapted to be fixed on the motor cycle, a pair of oppositely reciprocating jaws slidably mounted in the housing, link means pivotally mounted on said motorcycle interconnecting the jaws and having an operating connection to the pedal, opposite jaw faces having a series of diagonally disposed complementarily recessed steps respectively for the neutral and increased speed-ratio positions, a rod connected between the transmission and the gear shift adapted to be moved by the jaws in the same direction as the jaws for shifting gears and normally spring biased laterally toward the highest speed-ratio position, said rod including a transverse element interposed between the jaw faces and adapted to be received in said recessed steps, said rod being adapted to be moved in a direction toward the higher speed-ratios one step at a time with each movement of the pedal in one of said directions, and a manually actuated opposed spring bias element connected between a handlebar and the rod adapted when set in actuated position to urge the rod in a direction toward the lower speed-ratios with each movement of the pedal in one of said directions.

4. In a gear shift for a motorcycle having a transmission with a lowest gear-ratio position, a neutral position and at least one higher gear ratio position, a clutch associated with the transmission, and a shift pedal connected to the clutch, the combination of a housing adapted to be fixed on the motorcycle, a pair of jaws slidably mounted in the housing for relative reciprocation, a connection between at least one of said jaws and the pedal, opposite jaw faces having a series of complementary steps respectively for the lowest, neutral and the higher gear-ratio positions, an element responsive to jaw movement located between the jaw faces adapted to be moved step by step thereby, said last element being connected to the transmission, a manually actuated member operable from the handlebar and adapted when actuated to shift said element laterally toward lowest gear-ratio position, a neutral limit bar at neutral position adapted to block shift of the transverse element from neutral to the lowest gear position, said manually actuated member having a second position in operative engagement with the neutral limit bar, and said neutral limit bar being adapted when actuated to admit the transverse element to the lowest gear-ratio position.

5. In a gear shift for a motorcycle having a transmission with a lowest gear-ratio position, a neutral position and higher gear-ratio positions, a clutch associated with the transmission, and a shift pedal connected to the clutch, the combination of a housing adapted to be fixed on the motorcycle, a pair of oppositely reciprocating jaws slidably mounted in the housing, a reciprocating link means interconnecting the jaws and connected to the pedal, opposite jaw faces having a series of complementary steps respectively for the low, neutral and the higher gear-ratio positions, a transverse element between the jaw faces normally urged laterally toward the higher gear-ratio positions and adapted to be moved step by step upon reciprocation of the jaws, said transverse element being connected to the transmission, a trigger on a handlebar and a manually actuated spring bias member connected between the trigger and said transverse element adapted when actuated to urge said transverse element toward lower gear-ratio positions, a neutral limit bar at the neutral position adapted to block the shift of the transverse element from neutral to the lowest gear position, said trigger having a secondary manually actuated release connected therefrom to the neutral limit bar adapted when actuated to shift the position of the limit bar thereby to admit the transverse element to the lowest gear-ratio position.

GEORGE A. TATGE.

REFERENCES CITED

The following references are of record in the file of this patent:

UNITED STATES PATENTS

| Number | Name | Date |
|---|---|---|
| 1,771,608 | Benzing | July 29, 1930 |
| 1,959,476 | Janik | May 22, 1934 |
| 1,969,416 | Leece | Aug. 7, 1934 |
| 2,079,529 | Richardson | May 4, 1937 |
| 2,126,032 | Randol | Aug. 9, 1938 |
| 2,208,828 | Adams | July 23, 1940 |